May 4, 1948. W. F. ARDUSSI ET AL 2,441,054
ELECTRIC MOTOR REDUCING DRIVE UNIT
Original Filed Jan. 29, 1943
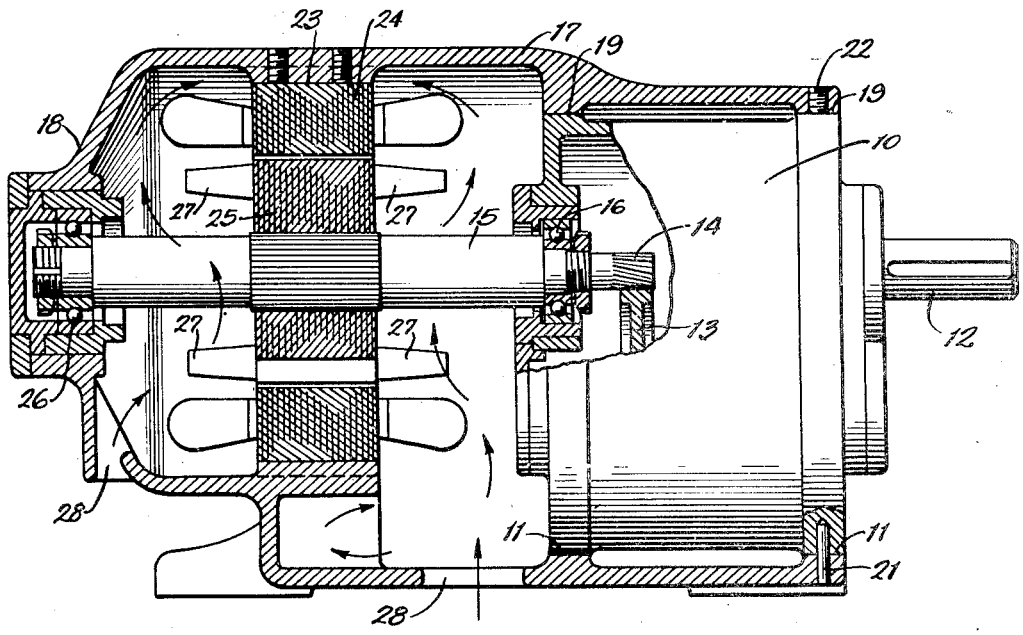
Inventors:
Wallace F. Ardussi and
William E. Walsh,
By Dawson, Ooms and Brett
Attorneys.

Patented May 4, 1948

2,441,054

UNITED STATES PATENT OFFICE 2,441,054

ELECTRIC MOTOR REDUCING DRIVE UNIT

Wallace F. Ardussi, Lakewood, Ohio, and William E. Walsh, Chicago, Ill., assignors to Foote Bros. Gear and Machine Corporation, Chicago, Ill., a corporation of Delaware Original application January 29, 1943, Serial No. 473,904. Divided and this application March 13, 1944, Serial No. 526,196

2 Claims. (Cl. 172—36)

This invention relates to speed reducing drive unit and more particularly to a combined motor and gear reduction unit.

One of the objects of the invention is to provide a speed reducing drive unit in which a single unitary housing contains both a motor and a gear reduction unit in the form of a self-contained cartridge carried by the housing.

Another object of the invention is to provide a speed reducing drive unit in which the housing containing the motor carries a cartridge type reducer unit and the motor shaft is supported at one end by a bearing in the reducer unit.

Still another object of the invention is to provide a speed reducing drive unit in which a single shaft serves both as the motor shaft and the input shaft of the reducer unit.

The above and other objects and advantages of the present invention will be more readily apparent from the following description when read in connection with the accompanying drawings, in which the single figure is a sectional view with parts in elevation of a drive unit embodying the invention.

The present invention contemplates as its primary feature a unit construction in which a single housing carries motor parts and is formed to receive a cartridge type gear reducer of the type more particularly described and claimed in our copending application, Serial No. 473,904 filed January 29, 1943, now abandoned, of which this application is a division. As shown in the drawing, and as more particularly disclosed in our copending application, the reducer unit comprises a closed substantially cylindrical casing 10 formed adjacent its ends with circular mounting flanges 11. A driven shaft 12 projects from one end of the casing and is connected through gearing indicated in part at 13 to a driving pinion 14 formed on the end of a driving shaft 15. The driving and driven shafts are rotatably supported in bearings 16 in the ends of the casing 10.

According to the present invention, a cartridge type gear unit of this character is adapted to be supported in a unitary housing which also forms a motor casing. As shown in the drawing, an elongated housing 17 is provided having one end closed at 18 and its opposite end open to receive the casing 10. The flanges 11 on the casing are adapted to seat on complementary flanges 19 in the housing and the casing may be held against movement in the housing by locking pins 21 and one or more set screws 22.

Adjacent its closed end the housing is formed with an internal annular seat 23 to receive stator windings 24 forming part of an electric motor. The armature windings 25 of the motor are mounted directly on the shaft 15 which is supported between the bearings 16 in the reducer unit and a bearing 26 in the closed end of the housing.

In this construction the motor is adapted to be cooled by axially extending fan blades 27 mounted on the armature 25 and drawing air into the housing through openings 28 therein. The air is circulated around the armature and field windings and is discharged through suitable openings not shown, in the sides of the motor housing.

While one embodiment of the invention has been shown and described in detail herein, it will be understood that this is illustrative only and is not intended as a definition of the scope of the invention, reference being had for this purpose to the appended claims.

What is claimed is:

1. A speed reducing drive unit comprising an elongated hollow housing formed adjacent one end with an annular seat for the stator of an electric motor and adjacent its opposite end with an internal cylindrical mounting flange for a gear unit, an annular stator mounted in said seat, a gear unit including a substantially cylindrical casing fitting in the mounting flange and terminating substantially flush with the outer end of the housing and having a driven shaft extending beyond the end of the housing, and a shaft extending from said one end of the housing into the gear casing and carrying an electric rotor in register with the stator and a driving gear in the casing.

2. A speed reducing drive unit comprising an elongated hollow housing having one end closure integral therewith and its other end open and formed adjacent said one end with an annular seat for the stator of an electric motor and adjacent its open end with an internal cylindrical mounting flange for a gear unit, an annular stator mounted in said seat, a gear unit including a substantially cylindrical casing fitting in the mounting flange and terminating substantially flush with the outer end of the housing and having a driven shaft extending beyond the end of the housing, and a shaft extending from said one end of the housing into the gear casing and carrying an electric rotor in register with the stator and a driving gear in the casing.

WALLACE F. ARDUSSI.
WILLIAM E. WALSH.

REFERENCES CITED

The following references are of record in the file of this patent:

UNITED STATES PATENTS

| Number | Name | Date |
| --- | --- | --- |
| 1,581,927 | Kollock | Apr. 20, 1926 |
| 1,965,669 | Robb | July 10, 1934 |
| 1,988,338 | Schmitter et al. | Jan. 15, 1935 |
| 2,170,548 | Christian | Aug. 22, 1939 |
| 2,173,339 | Myers | Sept. 19, 1939 |